US008705351B1

(12) United States Patent
McGlaughlin et al.

(10) Patent No.: US 8,705,351 B1
(45) Date of Patent: Apr. 22, 2014

(54) METHOD AND SYSTEM FOR LOAD BALANCING IN NETWORKS

(75) Inventors: Edward C. McGlaughlin, Minneapolis, MN (US); Alan C. Spalding, Laguna Hills, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 380 days.

(21) Appl. No.: 12/774,574

(22) Filed: May 5, 2010

Related U.S. Application Data (60) Provisional application No. 61/176,005, filed on May 6, 2009.

(51) Int. Cl.
*H04L 12/28* (2006.01)
*H04L 12/56* (2011.01)
*G06F 15/16* (2006.01)
*H04L 29/08* (2006.01)
*G06F 3/06* (2006.01)

(52) U.S. Cl.
CPC ........ *H04L 67/1097* (2013.01); *H04L 67/1002* (2013.01); *H04L 67/1008* (2013.01); *G06F 3/0664* (2013.01); *G06F 3/067* (2013.01); *H04L 49/356* (2013.01)
USPC ........... 370/230; 370/255; 370/220; 370/225; 370/254; 709/223; 709/226; 709/220

(58) Field of Classification Search
USPC .................................................. 718/105, 106
See application file for complete search history.

(56) References Cited

U.S. PATENT DOCUMENTS

| 5,404,515 | A  | * | 4/1995 | Chasse et al. | 718/106 |
|---|---|---|---|---|---|
| 6,229,538 | B1 | * | 5/2001 | McIntyre et al. | 715/734 |
| 7,467,191 | B1 | * | 12/2008 | Wang et al. | 709/221 |
| 7,865,596 | B2 | * | 1/2011 | Grosner et al. | 709/226 |
| 2009/0025007 | A1 | * | 1/2009 | Hara et al. | 718/105 |
| 2009/0254640 | A1 | * | 10/2009 | Otani | 709/221 |
| 2010/0246593 | A1 | * | 9/2010 | Belanger et al. | 370/419 |

OTHER PUBLICATIONS

Anonymous, "T11/08-172v2 FCoE: FCoE Initialization Protocol (FIP) Text Proposal", pub. before Jul. 25, 2008.*
Cisco Systems, Inc. "Fabric Manager Software Configuration Guide for the Cisco Nexus 5000 Series Switch Fabric Manager Software Release 3.4(1)", pub. Jun. 2008.*
Cisco Systems, Inc. "Cisco Nexus 5000 Series NX-OS Fibre Channel over Ethernet Configuration Guide, Release 4.2(1)N1(1)" pub. approx. 2010.*

* cited by examiner

*Primary Examiner* — Asad Nawaz
*Assistant Examiner* — Zhaohui Yang
(74) *Attorney, Agent, or Firm* — Klein, O'Neill & Singh, LLP (57) ABSTRACT

Method and system is provided for handling both network traffic and storage traffic to and from a plurality of nodes. The system includes a converged switch module that includes a plurality of ports configured to operate as a part of a group that is managed by a controller and each of the plurality of ports are configurable to process network traffic, storage traffic or a combination of both network traffic and storage traffic to and from a virtual port. The controller selects one of the plurality of ports to operate as a primary port for responding to a solicitation message from one of a plurality of nodes addressed to any of the ports within the group.

15 Claims, 5 Drawing Sheets

METHOD AND SYSTEM FOR LOAD BALANCING IN NETWORKS

CROSS-REFERENCE TO RELATED APPLICATION

This patent application claims priority to U.S. Provisional Patent Application Ser. No. 61/176,005, entitled "Method and System for Load Balancing in Networks" filed on May 6, 2009, the disclosure of which is incorporated herein in its entirety.

TECHNICAL FIELD

The present invention relates to networks.

BACKGROUND

Virtual machines and virtual ports are commonly used in the storage/networking environment. The increasing use of virtual machine partitions within servers demand an increase in the number of available virtual port identifiers (N_Port IDs (NPIVs)) on a switch port. Typical NPIV implementation has a limit of 127 or 255 virtual addresses per physical port. This limitation is undesirable because virtual machines may demand more virtual ports. Continuous efforts are being made to increase the number of ports.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment, a system is provided. The system includes a converged switch module configured for handling both network traffic and storage traffic to and from a plurality of nodes. The converged switch module includes a plurality of ports configured to operate as a part of a group that is managed by a controller. Each of the plurality of ports are configurable to process network traffic, storage traffic or a combination of both network traffic and storage traffic to and from a virtual port. The controller selects one of the plurality of ports to operate as a primary port for responding to a solicitation message from one of a plurality of nodes addressed to any of the ports within the group.

In another embodiment, a converged switch system configured for handling both network traffic and storage traffic to and from a computing node is provided. The converged switch module includes a plurality of ports configured to operate as a part of a group that is managed by a controller. Each of the plurality of ports are configurable to process network traffic, storage traffic or a combination of both network traffic and storage traffic to and from a virtual port for the computing node. The controller selects one of the plurality of ports to operate as a primary port for responding to a solicitation message received from the computing node and addressed to any of the ports of the group. An accept response is prepared to respond to the solicitation message and the accept response includes a descriptor field for identifying the selected port.

In yet another embodiment, a machine implemented method is provided. The method includes receiving a solicitation message from a requesting node at a converged switch module having a plurality of ports operating as a group and managed by a controller. Each of the plurality of ports are configurable to process network traffic, storage traffic or a combination of both network traffic and storage traffic to and from a virtual port.

The method further includes selecting one of the plurality of ports for corresponding with the requesting node; generating an accept response with a descriptor identifying the selected port; and transmitting the accept response to the requesting node via a primary port that is configured to communicate on behalf of other ports in the group.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

The following definitions are provided as they are typically (but not exclusively) used in the networking and storage environment, implementing the various adaptive aspects of the present invention.

"CNA" means a Converged Network Adapter; a device used by a server to access storage in a storage area network. A CNA can support both network (for example, Ethernet traffic) traffic and storage traffic (for example, Fibre Channel traffic).

"ENode" means a network node capable of supporting one or more VN_Port connections. Typically, this will be an Ethernet enabled I/O card with a driver executed by Server (i.e. host system).

"Ethernet Type" means a protocol identifier (ID) tag in the Ethernet packet.

"FCF" means a "Fibre Channel Forwarder" module that performs the FCoE Fibre Channel Initialization Protocol ("FIP") and initiates a connection with a virtual N_Port (VN_Port). FCF is also described in the T11/FC-BB-5 standard.

"FCoE" means Fibre Channel on Ethernet; a protocol that encapsulates Fibre Channel traffic for transport over Enhanced Ethernet.

"FC-MAP" means three byte value representing a Fibre Channel fabric being mapped.

"FCID" means a Fibre Channel ID address. The header may be a 24-bit address and include values identifying a frame's Domain, Area and Port ID (Port Identifier).

"FIP" means Fabric Initialization Protocol as defined by the FCoE protocol. FIP defines discovery and VN_Port initialization process. The FIP messages include Solicitation, Advertisement and FLOGI. FIP packets are identified with a specific Ethernet Type.

"L_Port" means a port that contains Arbitrated Loop functions associated with the Arbitrated Loop topology.

"N_Port" means a direct fabric attached port.

"NL_Port" means an L_Port that can perform the function of a N_Port.

"NPIV" (or NP_IV) means N_Port ID Virtualization that allows one to assign various identifiers to a physical port in an environment that uses Fibre Channel. The NP_IV identifiers create a plurality of virtual ports (referred to as VN_Ports) for the physical port.

"Port" is a general reference to a N. Sub.-Port or F.Sub.-Port in the Fibre Channel and/or FCoE environment. A port in a generic sense means a module that includes logic and circuitry for handling incoming and outgoing traffic. A port can be a part of a switch, an adapter or other devices.

"Primary FCF" means a FCF module that handles FIP Ethernet Type messages for a CNA.

"VN_Port" means a FCoE virtual end-point connection point. This is similar to an Fibre Channel N_Port. The VN_Port is associated with a specific ENode port and has its own VN_Port-MAC address as its unique identifier.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

Figure 1A:
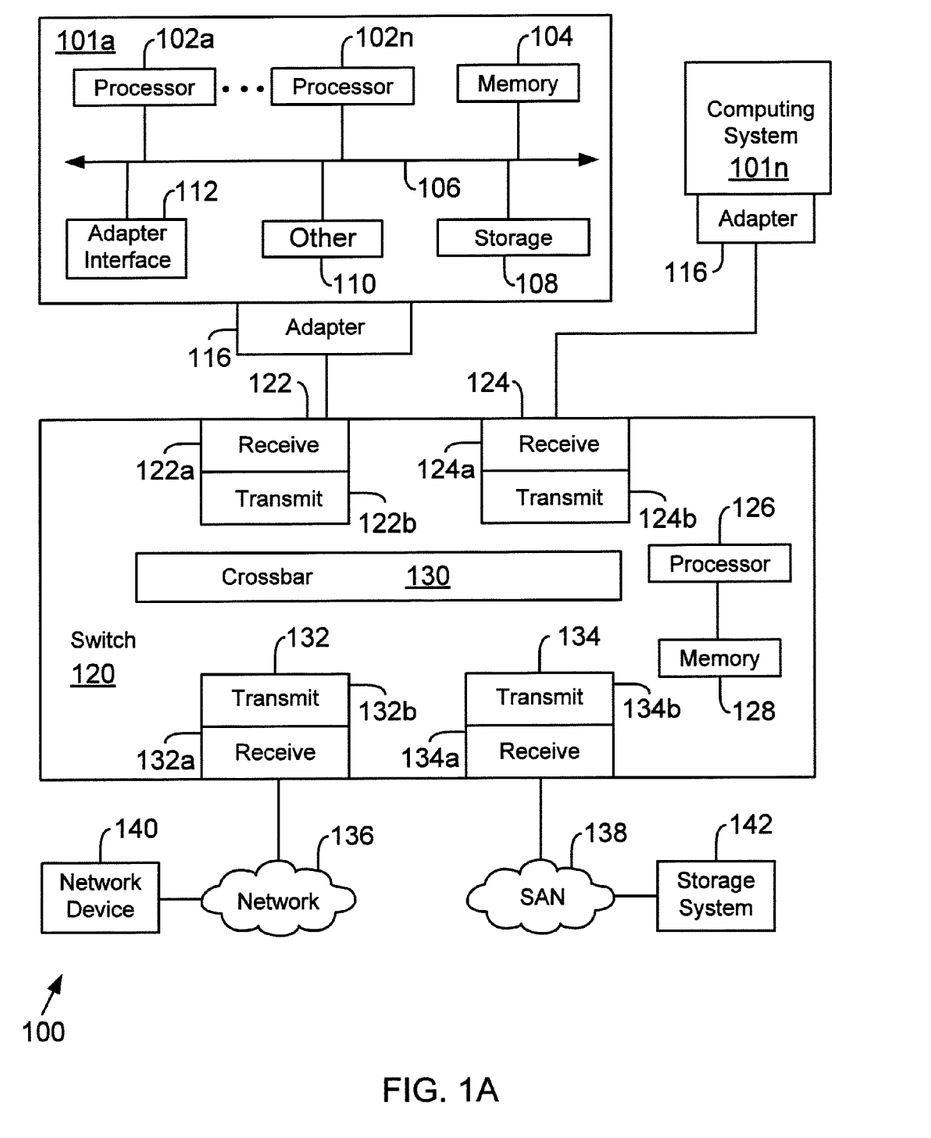
FIG. 1A is a block diagram of a system used according to one embodiment.

Network/Storage System:

FIG. 1A is a block diagram of a system 100 including a plurality of computing systems 101a-101n (may also be referred to as "host system 101") each having an adapter 116 operationally coupled to a switch 120. There may be other systems/components that may be placed between the aforementioned components but they are not germane to the embodiments disclosed herein.

Host system 101 may include one or more processors 102a-102n (jointly referred to as processor 102), also known as a central processing unit (CPU), interfacing with other components via a bus 106. Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind.

The host system 101 may also include a storage device 108, which may be for example a hard disk, a CD-ROM, a non-volatile memory device (flash or memory stick) or any other device. Storage 108 may store processor executable instructions and data, for example, operating system program files, application program files, and other files. Some of these files are stored on storage 108 using an installation program. For example, the processor 102 may execute computer-executable process steps of an installation program so that the processor 102 can properly execute the application program.

Host system 101 interfaces with a memory 104 that may include random access main memory (RAM), and/or read only memory (ROM). When executing stored computer-executable process steps from storage 108, the processor 102 may store and execute the process steps out of memory 104.

The host system 101 may also include other devices and interfaces 110, which may include a display device interface, a keyboard interface, a pointing device interface and others.

Host system 101 may also include an adapter interface 112 that allows the host system to interface with an adapter 116. The link between adapter 116 and adapter interface 112 may be a peripheral bus, for example, a PCI, PCI-X or PCI-Express link.

Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCoE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 116 shown in FIG. 1A may be configured to operate as a FCoE adapter. QLogic Corporation, the assignee of the present application, provides one such adapter. Those of ordinary skill in the art will appreciate, however, that the present embodiments are not limited to any particular protocol.

Adapter 116 facilitates communication between host 101 and network device 140 via switch 120 and network 136. Adapter 116 also facilitates communication between a storage system 142 via switch 120 and a storage area network 138.

Switch 120 includes a plurality of ports 122, 124, 132 and 134. Ports 122 and 124 are coupled to adapters 116. Port 132 is operationally coupled to a network 136 providing access to a network device 140. Port 134 is operationally coupled to SAN 138 and provides access to storage system 142.

Each of the plurality of ports include logic and structure to process incoming network and storage related traffic and then transmits them to their destination. For example, each port includes a receive segment to receive and process a network packet or frame. Each port also includes a transmit segment that transmits a packet to another port. The receive segment and transmit segment for each port is shown as 122a/122b, 124a/124b, 132a/132b and 134a/134b. The ports may communicate with each via a crossbar 130.

Switch 120 includes a processor 126 that has access to memory 128. Memory 128 may be used to store configuration information that is used for controlling switch 120 operations.

Figure 1B:
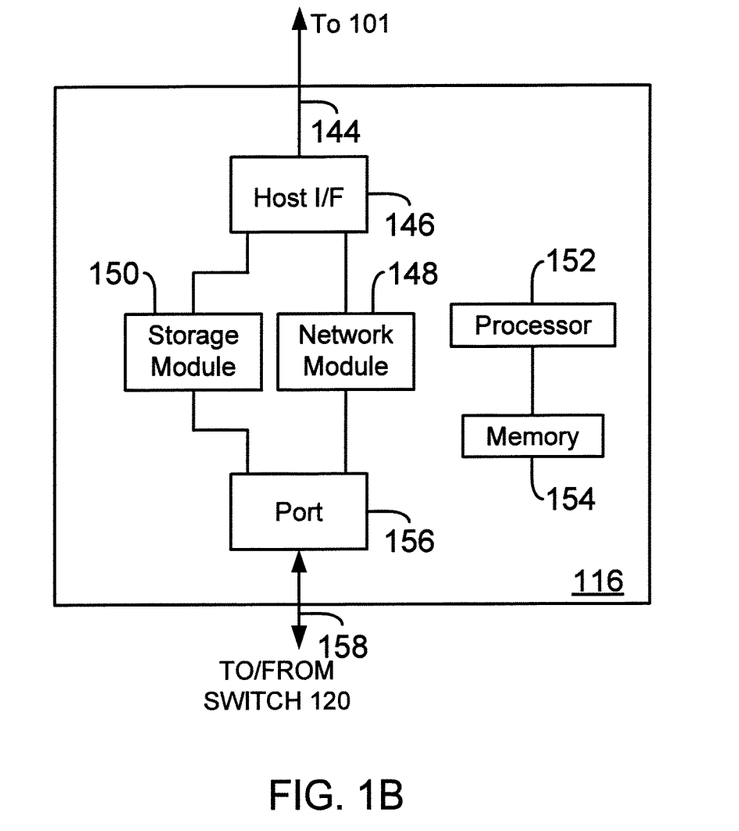
FIG. 1B shows a block diagram of a converged adapter.

Before describing details regarding of the various embodiments, the following provides a brief description of adapter 116. As shown in FIG. 1B, Adapter 116 may include a host interface 146, network module 148, storage module 150, adapter processor 152 and memory 154. The host interface 146 is configured to interface with host system 101, via bus 144. As an example, bus 144 may be a PCI, PCI-X, PCI-Express or any other type of interconnect.

Memory 154 may be used to store programmable instructions, for example, firmware. The adapter processor 152 executes firmware stored in the memory 154 to control overall functionality of adapter 116 and also interface with host 101 and other devices.

Network module 148 is used to process network packets, while storage module 150 is used to process storage traffic. Port 156 interfaces with other devices, for example, switch 120, via bus 158.

Figure 1C:
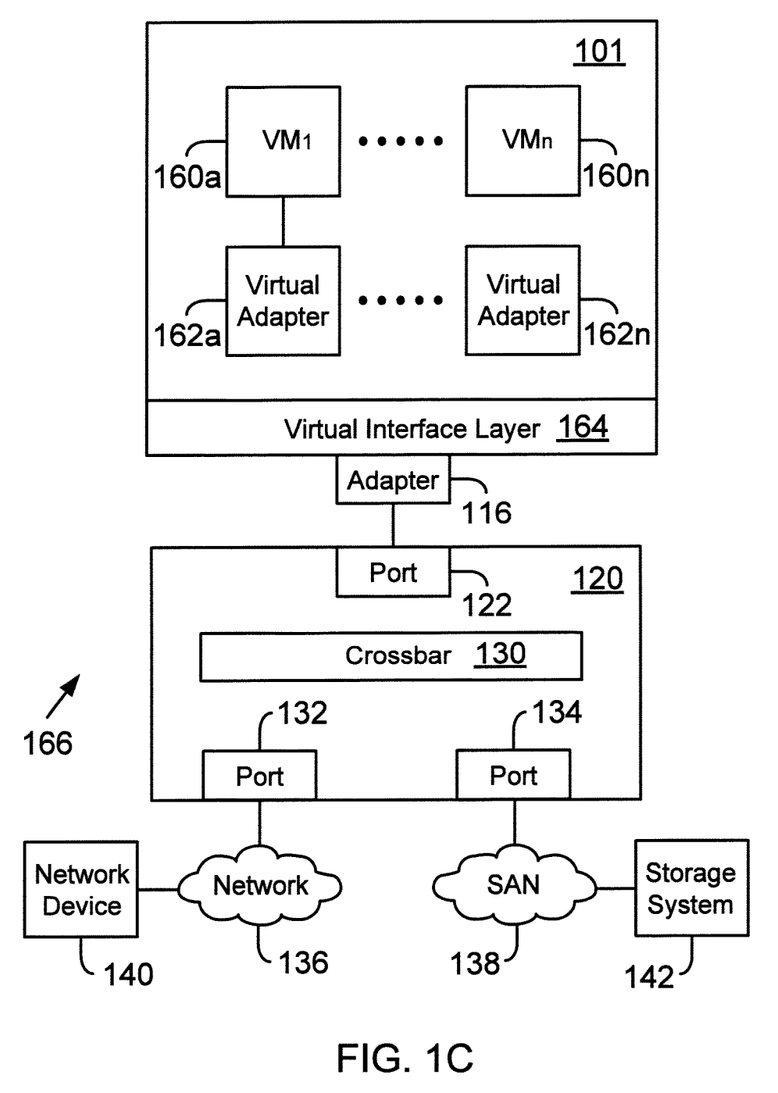
FIG. 1C shows an example of a virtual environment that can use the adaptive embodiment disclosed herein.

FIG. 1C shows an example of a virtual environment 166 for using the embodiments disclosed herein. One such environment/product is provided by VMWare Inc. and Microsoft Corp.

Virtual environment 166 may include a plurality of virtual machines 160a-160n (shown as VM1-VMn) that are executed by host 101. The virtual machines may execute images of different operating systems for example, Linux, Solaris, Windows@ based and others.

Each virtual machine is given access to a port of adapter 116 shown as virtual adapter 162a-162n. Multiple unique identifiers may be used for one adapter port. One such identifier is called NPIV (i.e. N_Port virtual ID virtualization), used in the Fibre Channel environment. By using NPIV, a single physical adapter port may be given multiple unique identifier values. This allows one physical port to be shared among multiple systems or operating systems, as shown in FIG. 1C.

Virtual machines communicate with target switch 120 via a virtual interface layer (VIL) 164. VIL 164 presents hardware resources, for example, adapter 116 to virtual machines. VIL 164 also interfaces with other devices, for example, switch 120. An example of VIL 120 is the Hypervisor layer that is provided by VMWare Inc. or the Hyper-V layer provided by Microsoft Corp.

Figure 2A:
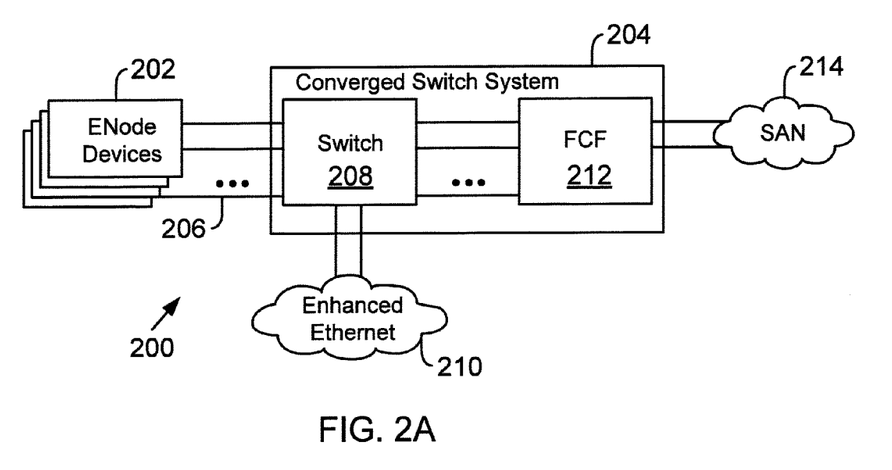
FIGS. 2A-2B show examples of a converged system, according to one embodiment.

FIG. 2A shows a converged system 200 for handling both storage and network traffic. In one embodiment, system 200 can support and enable FCoE traffic. System 200 includes a plurality of nodes, referred to as Enode 202. Enode 202 may be similar to computing systems 101 with adapter 116 for processing both network and storage traffic. Enode 202 may be a virtual machine (VM1) 160a that interfaces with converged switch system 204 via a virtual adapter 162a.

Enode 202 (or adapter ports) are operationally coupled to a network switch 208 (for example, an L2 Ethernet switch that can support Layer 2 enhanced Ethernet traffic) via network links 206. Enhanced Ethernet is an extension of Ethernet that includes priority flow control. Switch 208 is operationally coupled to a network 210, for example, an Enhanced Ethernet network. Enhanced Ethernet is a standard Ethernet fabric for processing traditional Ethernet traffic.

Switch 208 is also operationally coupled to a FCF module 212 that is operationally coupled to a storage area network 214. FCF module 212 is a multi-port switching device that performs the FCF function as described below in detail. FCF module 212 includes a plurality of ports that can be configured to interface with a SAN 214. SAN 214 may be able to support FCoE, Fibre Channel or any other protocol.

In one embodiment, switch 208 and FCF module 212 are separate operating modules. In another embodiment, switch 208 and FCF module 212 are integrated into a single converged system that is described below in detail with respect to FIG. 2B.

Figure 2B:
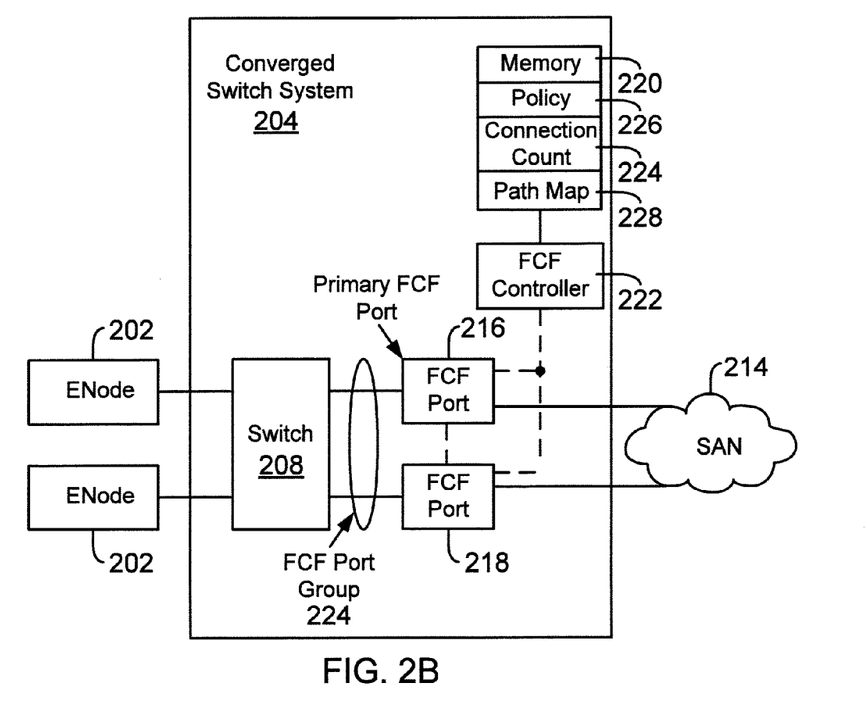

Referring to FIG. 2B, converged switch system 204 includes a plurality of FCF ports 216 and 218 (may also be referred to as ports 216 and 218). Ports 216 and 218 can be configured to operate as a group 224. Ports 216 and 218, as well as group 224 operation is controlled by a FCF controller 222. FCF controller 222 can be a processor, a state machine or any other type of hardware, software or a combination thereof. FCF controller 222 has access to memory 220 that stores information that can be used for selecting ports and routing frames. For example, memory 220 stores a policy 226 that can be used for routing frames/information. The policy defines port selection criteria and load balancing criteria for balancing network/storage traffic, as describe below. Memory 220 can also store information regarding how many connections a given port may be supporting at any given time. This is referred to as "connection count" 224. Memory 220 can also store a path selection map 228. Map 228 is used to select a particular port for servicing a particular connection, as described below in more detail with respect to the process flow diagrams.

Typically, ENode 202 relies on a FCF port for log-in and discovery operations, for example, the standard Fibre Channel login and discovery processes, referred to as FLOGI and FDISC. Because only a single port is used, this limits the ability to use different paths for a plurality of connections, for example, for a NPIV based connection especially in a virtual environment. The embodiments disclosed herein solve this limitation, as described below with respect to FIG. 3.

Figure 3:
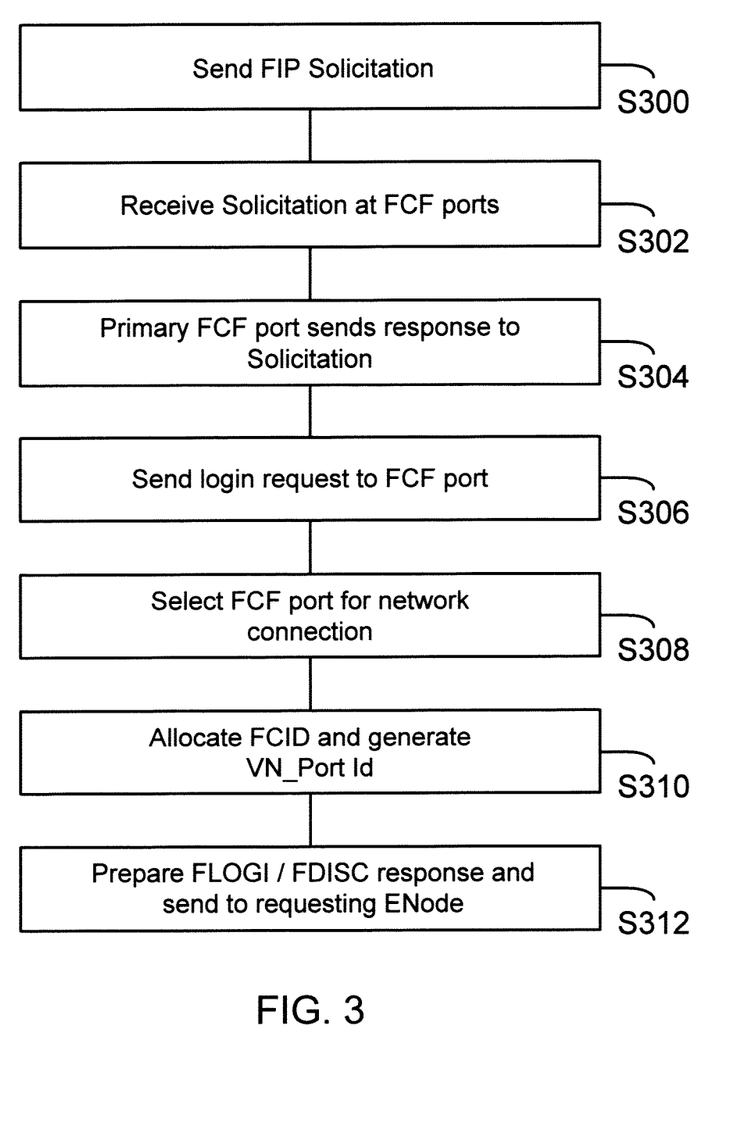
FIG. 3 shows a process flow diagram, according to one embodiment.

Process Flow:

FIG. 3 shows a process flow for selecting ports, according to one embodiment. The process begins in block S300, when an ENode sends a FCoE Initialization Protocol (FIP) Solicitation multi-cast to all FCF addresses that it can communicate with. Typically, an adapter (for example, 116) maintains a list of all FCF addresses that it can communicate with. The format of the multicast is provided by the FCoE protocol that describes initialization methods and format.

In block S302, all the FCF ports (for example, 216 and 218, FIG. 2B) operating within one or more FCF groups (for example, FCF group 224, FIG. 2B) receive the FIP Solicitation multicast.

In block S304, a primary FCF port (for example, 216, FIG. 2B) responds to the multicast. The primary FCF port is selected by FCF controller 222 and is configured to respond to all FIP Solicitation type messages. The primary FCF port can be configured before or after the multicast is received. The primary FCF port sends a response to the FIP Solicitation multicast.

After receiving the response from the primary FCF port, in block S306, the requesting ENode sends a login request to the primary FCF port. As an example, a FIP FLOGI request is sent by the ENode. The nature and the structure of the FIP FLOGI is established by the FCoE and Fibre Channel standards.

In block S308, the primary FCF port redirects the FIP FLOGI request to the FCF controller 222. The FCF controller 222 then selects one of the FCF ports for handling communication with the requesting ENode. FCF controller 222 can select a port based on different programmable criterion. For example, FCF controller 222 may select a port so as to optimally load balance traffic among different and active FCF ports of a group.

FCF controller 222 can use stored policy 226 for selecting the port. Policy 226 may include instructions for selecting a port with the least number of connections. FCF controller 222 maintains the connection count 224 for each port in memory 220. The connection count shows how many connections a port is handling at any given time. In one embodiment, FCF controller 222 selects the port with the least connection count.

In another embodiment, a different technique than the "least connection count" technique can be used to select the port. For example, a "Path Selection or Path reference" map can be used to select the port. The path preference map is the mapping table 228 stored at memory 220. The mapping table stores virtual world wide port numbers (VWWNs) associated with FCF port numbers. The VWWNs associate certain virtual ports to a FCF port. The FCF controller 222 selects the port from the mapping table 228.

The FCF controller 222 can also select a port for guaranteeing a Quality of Service for all the connections that are being handled by the converged switch system at any given time. The term Quality of Service as used herein means that each connection is granted a certain minimum level of bandwidth. The Quality of Service parameters and instructions can also be stored as part of policy 226.

The FCF controller 222 may select a port for providing failover for a particular connection. The term failover as used herein means that if connection fails for any reason, the connection can be moved over to another port/link such that information can still be sent and received for the failed connection. The FCF controller 222 uses policy 226 for supporting failover.

It is noteworthy that the policy 226 stored at memory 220 can be configured by a user using a management console (not shown but can be similar to host system 101). This provides flexibility in selecting a FCF port to meet different operating environments.

In block S310, the selected FCF port allocates or facilitates allocation of an FCID and generates a VN_Port ID using standard Fibre Channel NPIV login techniques. The FCID format includes a Domain value, an Area value and a Port_ID. This is shown in the Fibre Channel addressing scheme 400 of FIG. 4. The address identifier 400 includes a domain identifier 402 (Domain_ID), an Area identifier 404 (Area_ID) and a port identifier 406 (Port_ID).

Figure 4:
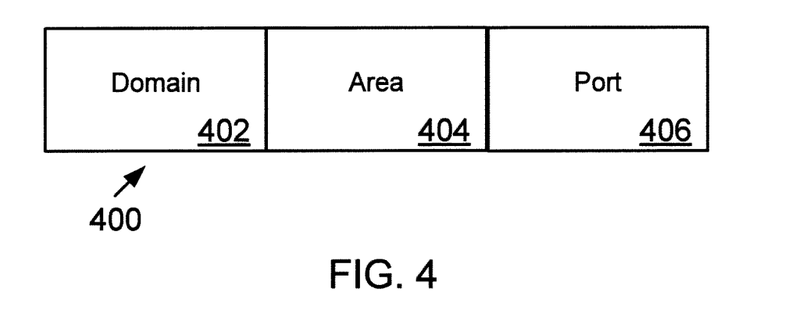
FIG. 4 shows a block diagram of a Fibre Channel header, used according to one embodiment.

The Domain_ID 402 comprises the upper 8 bits of a 24-bit Fibre Channel frame address. A Domain_ID 402 includes one or more Fibre Channel switches that have the same Domain_ID for all N_Ports and NL_Ports within or attached to switches. If there is more than one switch in the Domain, then each switch within the Domain is directly connected via an Inter-Switch Link (ISL) to at least one other switch in the same Domain.

The Area_ID 404 comprises the middle 8 bits of a 24-bit Fibre Channel address. The Area_ID 404 applies either to (a) one or more N_Ports within and attached to a Fibre Channel switch; or (b) an Arbitrated Loop of NL_Ports attached to a single FL_Port.

The Port_ID 406 comprises the lower 8 bits of a 24-bit Fibre Channel address. The Port_ID 406 applies to either (a) a single N_Port or virtualized N_Port within a Domain/Area, or (b) the valid arbitrated loop physical address (AL_PA) of a single NL_Port or FL_Port on an Arbitrated Loop.

Referring back to FIG. 3, in block S312, an accept response is sent to the ENode by the primary FCF port. The accept response is created by adding a descriptor that identifies the FCF port selected to respond to the requesting ENode. As an example, the descriptor may be a FCoE MAC address that is inserted in an unused field. The accept response also includes the granted FCID and "a Granted MAC Address". The Granted MAC Address identifies the MAC address for the ENode. An example of an accept response is provided below with the "Granted MAC Address" and the added "FCoE MAC Address" identifying the assigned FCF port.

The following provides an example of an accept response from a primary FCF port. The accept response includes a standard "FLOGI/NPIV FDISC LS_ACC" response. The FLOGI/NPIV FDISC LS_ACC is a format for an accept response that is provided by the FCoE and FC standards. The standard response however does not include the FCoE MAC Address that is inserted in the accept response.

| FIP Operation Code = 0002 h | Reserved | SubCode = 02 H | |
|---|---|---|---|
| Descriptor List Length = 43 | | Flags | |
| Type = 7 | Len = 36 | Reserved | |
| | FLOGI/NPIV FDISC LS_ACC | | |
| Type = 2 | Len = 2 | | |
| | Granted MAC Address | | |
| Type = 241 | Len = 5 | | Reserved |
| X | x | X | x |
| X | x | X | x |
| Type = 2 | Len = 2 | | |
| | FCoE MAC Address | | |

In one embodiment, a converged network system is provided. The system includes a plurality of FCF Ports operating as a group and managed by an FCF Controller 222 that enables load balancing, failover, Quality of Service and other policy based selections.

In another embodiment, a converged network system with a plurality of FCF Ports operating as a multi-port FCF is provided. A FCF port for handling FCoE Ethernet Type traffic for a VN_Port (virtual port) can be selected based on a plurality of factors, for example, the World Wide Number (WWN) of a Soliciting ENode, the average load level, Quality of Service, and other policy based methods.

In yet another embodiment, a converged network system with a plurality of FCF Ports operating as a multi-port FCF where one of the FCF ports operates as Primary FCF port for handling FIP Ethernet Type commands is provided. A FCF Controller dynamically assigns a selected FCF to handle FCoE Traffic for a given VN_Port connection. The FCF port assignment is conveyed by a Primary FCF to a requesting ENode as a special descriptor (for example, a FCoE MAC Address descriptor) in an accept response.

In another embodiment, Converged Network system is provided. The system includes a plurality of FCF Ports operating as a multi-port FCF coordinated by an FCF Controller that has access to a memory (FCF Policy Memory). The FCF Policy Memory includes connection counts per FCF Port and preferred ENode-to-FCF Port paths assignments. This information may be used to determine load balancing, failover, Quality of Service and other policy based selections.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A system, comprising:
a converged switch module having a processor, a first switching module that is configured for handling network traffic to and from a plurality of nodes, and a second switching module having a plurality of ports configured to operate as a part of a group that is managed by a controller, and each of the plurality of ports is configurable to process network traffic, storage traffic, or a combination of both network traffic and storage traffic to and from a virtual port;
wherein the plurality of ports are presented to the first switch module as the group and are coupled to a storage area network for sending and receiving information complying with a storage protocol or a converged protocol; and
wherein the controller selects one of the plurality of ports to operate as a primary port, and the primary port responds to a solicitation message from one of a plurality of nodes addressed to any of the ports within the group; and
wherein the controller maintains a connection count for the plurality of ports and selects a port with a least connection count as the primary port to communicate with the requesting node.

2. The system of claim 1, wherein the plurality of ports are configured to handle Fibre Channel over Ethernet (FCoE) traffic.

3. The system of claim 1, wherein the port is selected based on a stored policy that is accessible to the controller.

4. The system of claim 1, wherein an accept response is prepared to respond to the solicitation message and the accept response includes a descriptor field for identifying the selected port.

5. The system of claim 4, wherein the accept response is transmitted by the primary port.

6. The system of claim 1, wherein the controller selects the port for maintaining load balance among the plurality of ports.

7. A machine implemented method, comprising:
receiving a solicitation message from a requesting node at a converged switch module having a first switching module that is configured for handling network traffic to and from a plurality of nodes, and a second switching module having a plurality of ports operating as a group and managed by a controller; wherein each of the plurality of ports is configurable to process network traffic, storage traffic, or a combination of both network traffic and storage traffic to and from a virtual port;
wherein the plurality of ports are presented to the first switch module as the group and are coupled to a storage area network for sending and receiving information complying with a storage protocol or a converged protocol;
selecting one of the plurality of ports to operate as a primary port for corresponding with the requesting node;
the primary port generating an accept response with a descriptor identifying the selected port; and
the primary port transmitting the accept response to the requesting node;
wherein the controller maintains a connection count for the plurality of ports and selects a port with a least connection count as the primary port to communicate with the requesting node.

8. The method of claim 7, wherein the plurality of ports are configured to handle Fibre Channel over Ethernet (FCoE) traffic.

9. The method of claim 7, wherein the primary port is selected based on a stored policy that is accessible to the controller.

10. The method of claim 7, wherein the controller selects the primary port for maintaining load balance among the plurality of ports.

11. A converged switch system having a processor and a first switching module that is configured for handling network traffic to and from a computing node, comprising:
a second switching module having a plurality of ports configured to operate as a part of a group that is managed by a controller and each of the plurality of ports are configurable to process network traffic, storage traffic or a combination of both network traffic and storage traffic to and from a virtual port for the computing node;
wherein the plurality of ports are presented to the first switch module as the group and are coupled to a storage area network for sending and receiving information complying with a storage protocol or a converged protocol; and
wherein the controller selects one of the plurality of ports to operate as a primary port, and the primary port responds to a solicitation message received from the computing node and addressed to any of the ports of the group;
wherein an accept response is prepared to respond to the solicitation message and the accept response includes a descriptor field for identifying the selected port; and wherein the controller maintains a connection count for the plurality of ports and selects a port with a least connection count as the primary port to communicate with the requesting node.

12. The converged switch system of claim 11, wherein the plurality of ports are configured to handle Fibre Channel over Ethernet (FCoE) traffic.

13. The converged switch system of claim 11, wherein the port is selected based on a stored policy that is accessible to the controller.

14. The converged switch system of claim 11, wherein the accept response is transmitted by the primary port.

15. The converged switch system of claim 11, wherein the controller selects the port for maintaining load balance among the plurality of ports.

* * * * *